(12) United States Patent
Tezuka

(10) Patent No.: US 6,265,796 B1
(45) Date of Patent: Jul. 24, 2001

(54) MOTOR ARMATURE HAVING A MAGNETIC MEMBER FOR RESTART POSITIONING

(75) Inventor: Taketoshi Tezuka, Yamanashi (JP)

(73) Assignee: TKS Co., Ltd., Yamanashi (JP)

( * ) Notice: Subject to any disclaimer, the term of this patent is extended or adjusted under 35 U.S.C. 154(b) by 0 days.

(21) Appl. No.: 09/424,503

(22) PCT Filed: Sep. 12, 1997

(86) PCT No.: PCT/JP97/03244

§ 371 Date: Nov. 24, 1999

§ 102(e) Date: Nov. 24, 1999

(87) PCT Pub. No.: WO98/54818

PCT Pub. Date: Dec. 3, 1998

(30) Foreign Application Priority Data

May 27, 1997 (JP) .................................... 9-136733

(51) Int. Cl.$^7$ .............................. H02K 7/65; H02K 7/75; H02K 23/54
(52) U.S. Cl. ....................................... 310/67 R; 310/68 B
(58) Field of Search ................................ 310/67 R, 68 B, 310/268, 40 MM; 29/596–598

(56) References Cited

U.S. PATENT DOCUMENTS

| | | | |
|---|---|---|---|
| 4,839,551 | * | 6/1989 | Tomisawa ........................ 310/90 |
| 4,861,237 | * | 8/1989 | Shiraki et al. ................... 417/353 |
| 4,864,276 | * | 9/1989 | Tribbey et al. ................. 340/407.1 |
| 4,891,537 | * | 1/1990 | Shiraki et al. .................. 310/68 B |
| 5,793,133 | * | 8/1998 | Shiraki et al. .................... 310/81 |
| 6,051,900 | * | 4/2000 | Yamaguchi ....................... 310/81 |

FOREIGN PATENT DOCUMENTS 63-88060    6/1988    (JP) .

\* cited by examiner

*Primary Examiner*—Tran Nguyen
(74) *Attorney, Agent, or Firm*—Wenderoth, Lind & Ponack, L.L.P.

(57) ABSTRACT

A structure for an armature of a motor is constructed of a coreless armature coil and a commutator, rotatably arranged on a field magnet. The armature is equipped with either a magnetic material made of iron pins or a permanent magnet having N and S poles, so that the magnetic material or permanent magnet may be positioned over the boundary between the N and S poles of the field magnet, when the rotation of the armature is interrupted, so as to bring the coreless armature coil to a starting position. As a result, the rotation for starting the armature can be effected reliably and smoothly even when the armature is made of one or two coreless armature coils.

6 Claims, 13 Drawing Sheets

MOTOR ARMATURE HAVING A MAGNETIC MEMBER FOR RESTART POSITIONING

BACKGROUND OF THE INVENTION.

1. Field of the Invention

The present invention relates to an armature structure for a flat motor to be applied to a device for transmitting vibrations to a human body, and particularly to an armature structure for smoothly restarting at any time an armature composed of one or plural coreless armature coils.

2. Related Art

As a device aiming at transmitting vibrations to a human body, various devices are known such as a wireless telephone paging device (hereinafter referred to as a pager), a cellular telephone, a massager for displaying a massage effect by giving a slight vibration to a human body, a signal receiver for a visual and auditory handicapped person and the like, each of which has a built-in-flat motor having an eccentric armature.

As such a flat motor, for example, a flat-type vibration generator as shown in FIGS. 14 and 15 is known (Japanese Patent Laid-Open Publication No.Hei6-205,565). The vibration generator 1 is composed of a circular plate-type field magnet 3 fixed on the bottom of a casing 2, a freely turnable armature 4 arranged so as to face this field magnet 3, and a shaft 5 positioned at the pivot of this armature 4. The armature 4 is made by molding three coils 6a, 6b and 6c arranged in the shape of an inverse fan together with a resin frame 7 into one body. The armature 4 is provided with commutators 8 to turn together with the coils 6a, 6b and 6c, and these commutators 8 are brought into contact with two electrode brushes 9 extending from the bottom of the casing 2 and thereby the polarities of the three coils 6a, 6b and 6c are alternately switched over, and every switchover of the polarities generates an attractive force and a repulsive force between the armature and the field magnet 3, and therefore the armature 4 continues turning. Particularly in case of using such a flat motor as a vibration generator, since the armature is turned having a great centrifugal force by making the armature 4 itself greatly eccentric as described above, a strong vibration is generated all over the device.

In recent years miniaturization of a pager, a cellular phone, a massager, a signal receiver for a visual and auditory handicapped person and the like has become more and more advanced, and according to this, miniaturizing and lightening of the vibration generator has also become intensely demanded. As described above, however, since a turning force of the armature 4 is generated by repeated alternation of an attractive force and a repulsive force between the coils 6a, 6b and 6c whose polarities are alternately switched over and the field magnet 3, at least three coils 6a, 6b and 6c are necessary. The reason is, as shown in FIG. 16, in the case where the armature 4 is made of a single coil 6 having a central angle of about 90 degrees of rotation, if when the armature 4 is stopped, it comes into one of N and S poles obtained by dividing the magnet 3 into quarters (S pole in FIG. 16), a problem occurs that when attempting to start the armature 4 the next time the armature 4 is not defined in its turning direction and cannot be smoothly started. This is a phenomenon which appears in case where both side portions 6d and 6e of the coil 6 stay within a domain Z on the magnet 3 corresponding to the winding width of the coil 6.

As a result, an object of the present invention is to make it possible to increasingly miniaturize and lighten a flat motor by providing an armature structure in which an armature can be surely and smoothly started to turn even in cases where that the armature is composed of one or two coils.

Another object of the invention is to simplify the manufacturing process of an armature and reduce its manufacturing cost by decreasing the number of coils to form the armature.

SUMMARY OF THE INVENTION

An armature structure of a flat motor according to the present invention is characterized by a fact that it comprises an armature of a flat motor having one or plural coreless armature coils provided over a field magnet having alternately N and S poles so as to relatively turn with an axial spacing between the armature and the field magnet, wherein;

the armature is provided with a magnetic material, and when the armature is stopped, the coreless armature coil is brought to a starting position by positioning the magnetic material at the boundary between N and S magnetic poles of the field magnet and making the N and S poles of the field magnet and the S and N poles generated in the magnetic material respectively, attract each other.

An armature structure of a flat motor according to the present invention is characterized by a fact that it comprises an armature of a flat motor having one or plural coreless armature coils provided over a field magnet having alternately N and S poles so as to relatively turn with an axial spacing between the armature and the field magnet, wherein;

the armature is provided with a permanent magnet having N and S poles, and when the armature is stopped from turning the coreless armature coil is brought to a starting position by positioning the permanent magnet at the boundary between N and S magnetic poles of the field magnet and making the N and S poles of the field magnet and the S and N poles of the permanent magnet respectively attract each other. An armature structure of a flat motor according to the present invention is characterized by a fact that the number of coreless coils is one and a magnetic material or a permanent magnet having N and S poles projects from one side portion of a frame holding the coreless armature coil.

An armature structure of a flat motor according to the present invention is characterized by a fact that the number of said coreless coils is one and a magnetic material or a permanent magnet having N and S poles is embedded in a flame holding the coreless armature coil.

DESCRIPTION OF THE PREFERRED EMBODIMENTS

Embodiments of an armature structure of a flat motor according to the present invention are described in detail with reference to the drawings in the following.

Figure 1:
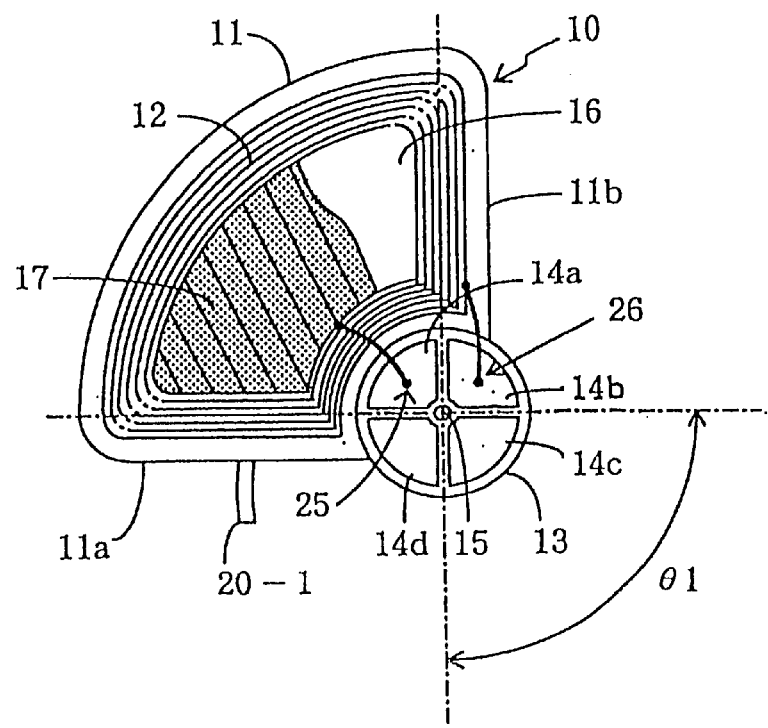
FIG. 1 is a plan view showing a first embodiment of an armature structure of a flat motor of the present invention.
Figure 2:
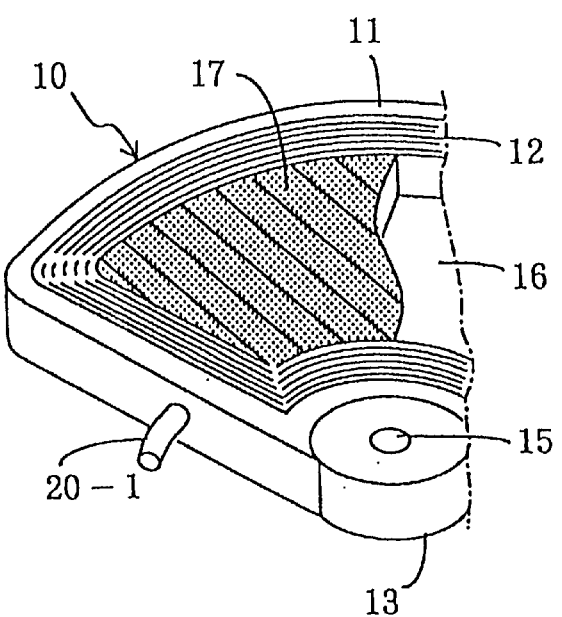
FIG. 2 is a perspective view showing a main part of the armature.

FIGS. 1 and 2 show a first embodiment of an armature structure of a flat motor of the present invention. An armature 10 is formed by arranging a single coreless armature coil 12 inside a resin frame 11 which is approximately in the shape of a quadrant and molding both of them into one body. Commutators 14a, 14b, 14c and 14d obtained by dividing a circle into quarters are provided at the pivot portion 13 of the resin frame 11, and an axis hole 15 to be the center of rotation of the armature 10 is made at the center of the commentators 14a 14b 14c and 14d. A coreless armature coil 12 is a single-winding coil in a shape approximately corresponding to the shape of the resin frame 11, and the opening angle 1 between both side edges is about 90 degrees. Among the commutators 14a, 14b, 14c and 14d, one pair of commutators 14a and 14c which are diagonally opposite to each other are commonly connected to each other, and the other pair of commutators 14b and 14d which are diagonally opposite to each other are commonly connected to each other, and one commutator of the one pair is connected to the inside winding terminal 25 of the coreless armature coil 12 and one commutator of the other pair is connected to the outside winding terminal 26. In the case of using the armature 10 as a vibration generating motor, it is preferable to provide a weight 17 in the empty central part 16 of the coreless armature coil 12 (a part of the weight 17 is broken away in the figure). Although the central angle of rotation of the armature 10 of FIG. 1 is about 90 degrees, it is not limited to about 90 degrees in particular.

In this embodiment, a piece of magnetic material 20-1 made of an iron pin and the like projects sideward from one side edge 11a of the resin frame 11. This piece of magnetic material 20-1 is formed into a round bar or cylinder and is slightly inwardly curved so as to form a part of an arc say. The projecting direction of the piece of magnetic material 20-1 is nearly parallel with the direction of rotation or reverse rotation of the armature 10, and is perpendicular to the one side edge 11a. It is easy to make N and S poles at both sides of the piece of magnetic material 20-1 by forming the sectional shape of the magnetic material 20-1 into a circle. Even if the magnetic material 20-1 is not in the shape of a round bar but in the shape of a cylinder, the same effect is obtained.

Since the strength of a magnetic force of the piece of magnetic material 20-1 depends upon the length or the sectional area of the piece of magnetic material 20-1, it needs to be properly selected. That is to say, it is necessary to consider that while a magnetic force to force the armature 10 to stop at a specified position is required when stopping the armature 10, the magnetic force needs to be to such a degree that it does not impede rotation of the armature 10 when it is rotating. The shape of a magnetic material is not limited to a round bar or a cylinder like the magnetic material 20-1, but the same effect can also be obtained also by projecting a small piece in the shape of a flat plate or an ellipsoid.

Figure 3:
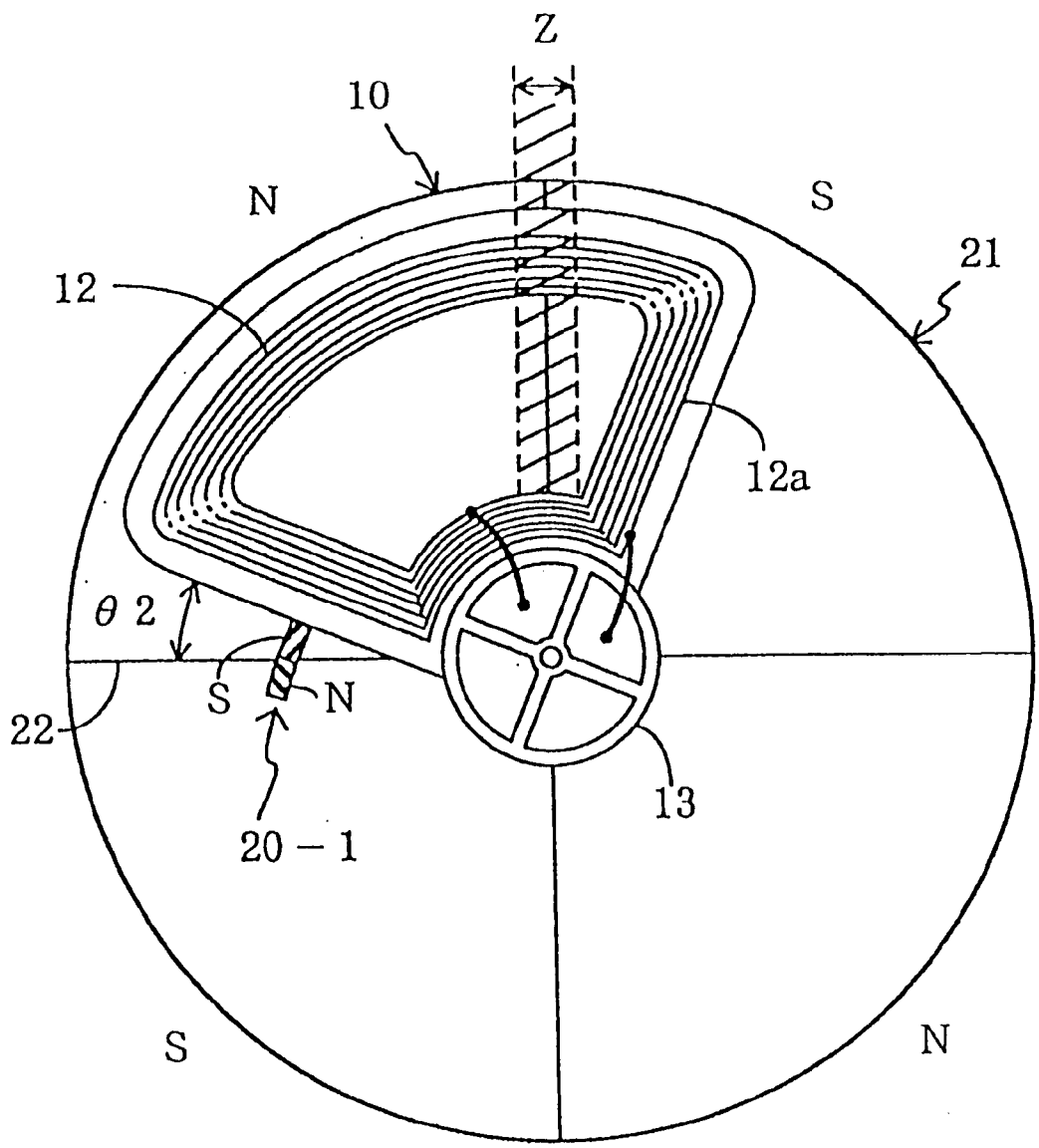
FIG. 3 is a plan view showing a stop position of the armature on a magnet.

FIG. 3 shows a positional relation at the time of stopping the armature 10 having the above-mentioned composition by means of a field magnet 21. The field magnet 21 is obtained by dividing a disk into quarters and arranging N and S poles alternately with each other, and rotatably holds the pivot portion 13 of the armature 10 at the center of the field magnet 21. When the armature 10 is turned clockwise or counterclockwise over the field magnet 21 and then a power source to supply power to the coreless armature coil 12 of the armature 10 is turned off, the armature 10 is stopped in a state where the center in the longitudinal direction of the piece of magnetic material 20-1 is located on a border line 22 between N and S poles of the field magnet 21. That is to say, the armature 10 is stopped over the N pole of the field magnet 21 in astute where it is shifted by an angle θ2 corresponding to half of the length of the piece of magnetic material 20-1, and comes into a state where one side portion 12a of the coreless armature coil 12 projects to the other side S pole adjacent to it. The reason for this is that when the armature 10 is stopped the piece of magnetic material 20-1 is influenced by the field magnet 21 to generate a magnetic field around it and both ends of the piece of magnetic material 20-1 come to have the magnetic poles reverse to those of the field magnet 21 (S pole to the N pole of the field magnet and N pole to the S pole), and therefore the magnetic material 20-1 and the field magnet 21 attract each other and overcome a free rotation of the armature 10 and force it to stop at that position. In such a way, since one side portion 12a of the coreless armature coil 12 projects greatly to the S pole side from a domain Z on the field magnet 21 where the armature 10 is difficult to start, the armature 10 can be smoothly started.

Next, the principle of rotation of an armature according to the present invention is described with reference to FIGS. 4 to 6. Two electrode brushes 23 and 24 extend over the field magnet 21 and the head portions of the brushes 23 and 24 are brought into contact with commutators 14a, 14b, 14c and 14d of the armature 10.

The electrode brushes 23 and 24 slide and shift on the commutators 14a, 14b, 14c and 14d one after another at intervals of about 90 degrees. FIG. 4 shows a state where the armature 10 is at a stop. As described above, at this time the piece of magnetic material 20-1 is located on the boundary line between the N1 pole and the S2 pole of the field magnet 21, and a major portion of the coreless armature coil 12 overlaps the N1 pole of the field magnet 21 and one side portion 12a of the coreless armature coil 12 overlaps the S1 pole of the field magnet 21. When a switch is turned on in this state, an electric current flows through the commutator 14d being in contact with the head portion of the electrode brush 23 and the commutator 14b connected commonly to the commutator 14d from the outside winding terminal 26 of the coreless armature coil 12 into the coreless armature coil 12 and the electric current flows through the commutators 14a and 14c from the inside winding terminal 25 to the electrode brush 24 side, and thereby a magnetic field is generated in the coreless armature coil 12. At this time, assuming that the polarity of a magnetic field generated at the opposite side of the coreless armature coil 12 to the field magnet 21 is an N pole, this N pole has the same polarity as the N1 pole of the field magnet 21 located directly under this N pole and therefore a repulsive force is generated between them and on the other hand, this N pole and the adjacent pole S1 of the field magnet 21 attract each other, and therefore a rotational force is generated in this direction (in the clockwise direction) to start the armature 10 to turn. And when the armature 10 turns to a position shown in FIG. 5, the contact head portion of one electrode brush 23 comes into the gap between the commutators 14c and 14d, and the contact head portion of the other electrode brush 24 comes into the gap between the commutators 14a and 14b, and therefore the coreless armature coil 12 comes to have no electric current flowing into it and no magnetism, but the armature 10 continues turning due to its turning inertia.

Figure 4:
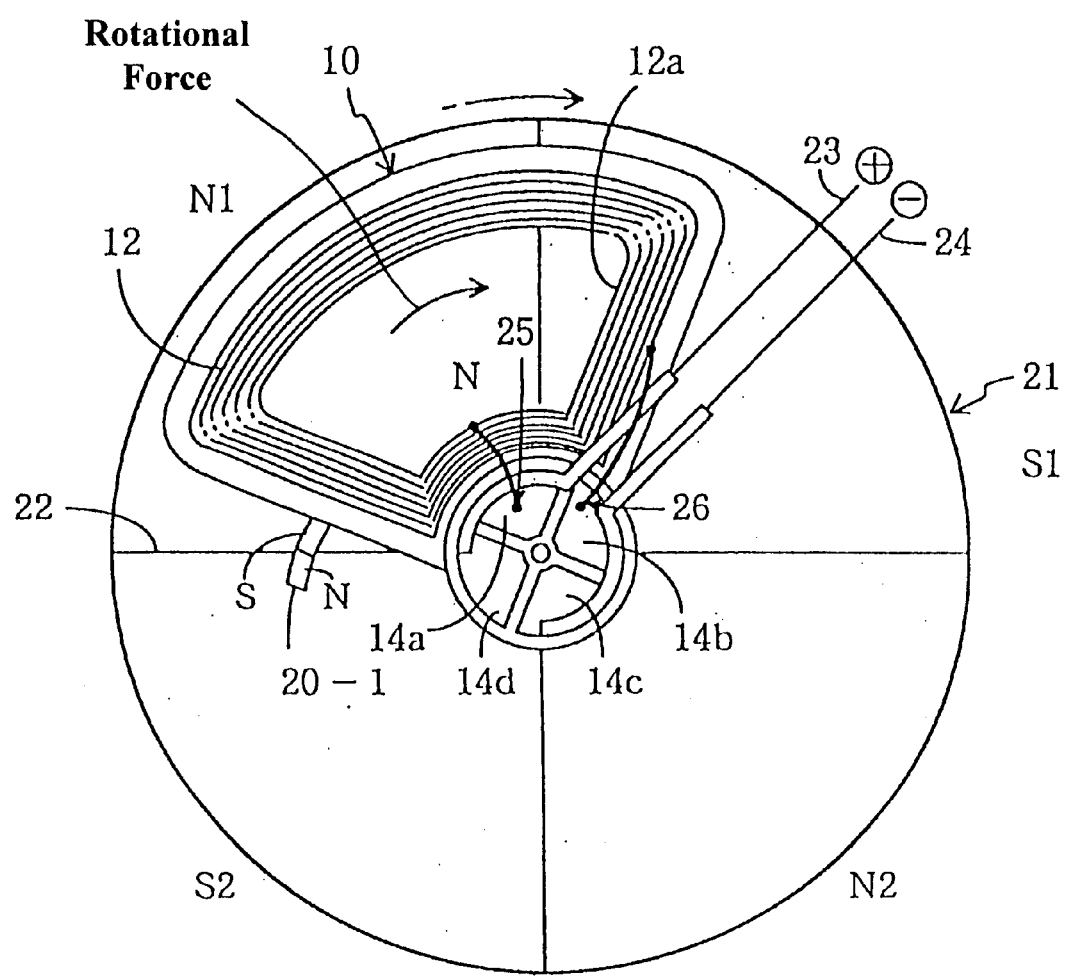
FIG. 4 is an explanatory figure for showing the principle of rotation of an armature composed of a single coil, the figure showing a state at the time of starting.
Figure 5:
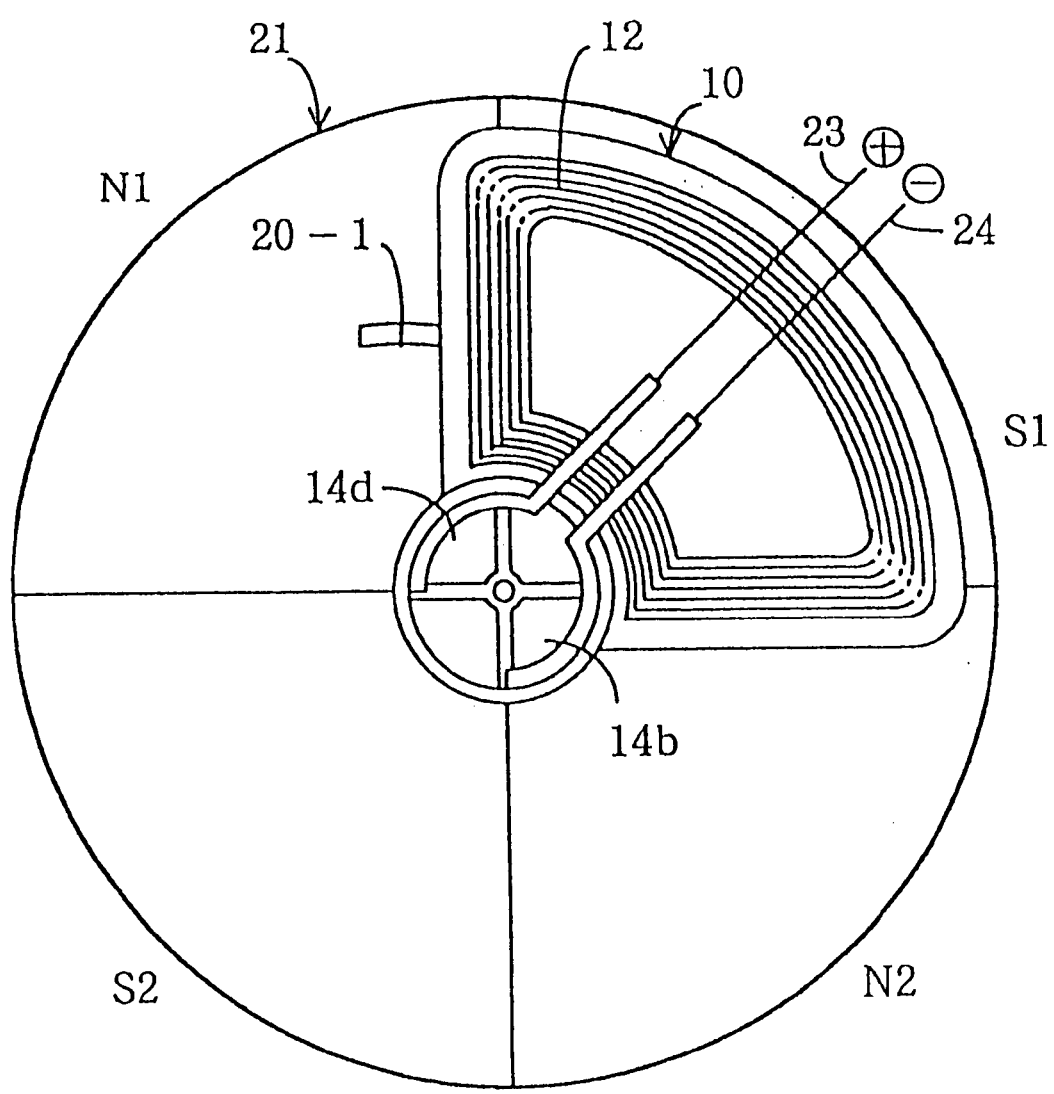
FIG. 5 is an explanatory figure for showing the principle of turning of an armature composed of a single coil, the figure showing a state immediately after starting.
Figure 6:
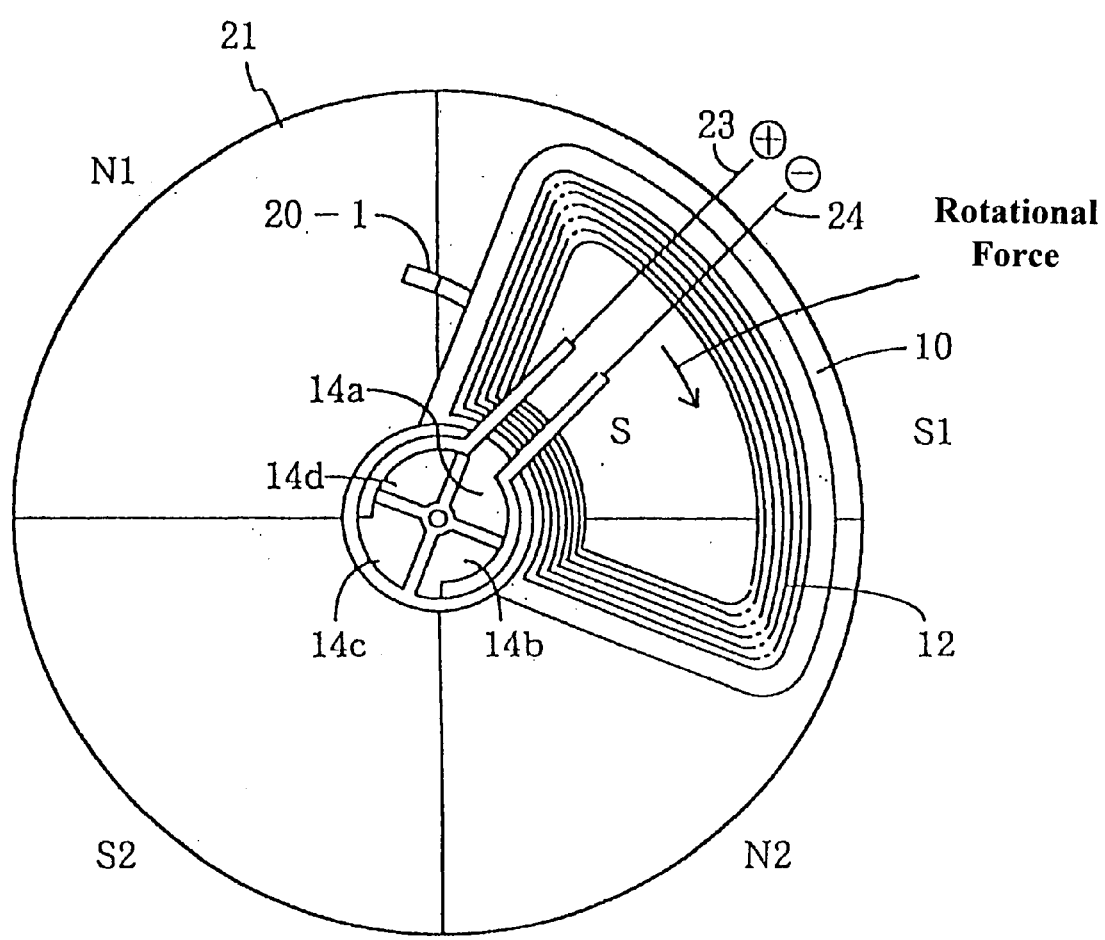
FIG. 6 is an explanatory figure for showing the principle of turning of an armature composed of a single coil, the figure showing a state of continuing rotation.

Furthermore, when the armature turns to a position shown in FIG. 6, contrarily to the case of FIG. 4, an electric current supplied from the electrode brush 23 flows through the commutators 14c and 14a from the inside winding terminal 25 into the coreless armature coil 12 and flows out through the commutator 14d from the outside winding terminal 26 to the electrode brush 24. Accordingly, the coreless armature coil 12 has a reverse pole S generated at the opposite side to the field magnet 21 and this S pole and the pole S1 of the field magnet 21 under it repel each other and therefore the armature 10 is given a turning force in the same direction to continue turning.

In this way, the armature 10 repeats alternately N and S as turning to repeat repulsion and attraction with the field magnet 21, and thereby can continue turning. And by making the armature 10 of a single coreless armature coil 12 as described above and providing a weight 17, a great centrifugal force can be obtained and a great effect can be obtained in the case of using it as a vibration generator.

In the case of turning the armature 10 in the reverse direction (counterclockwise direction), the turning direction can be easily changed by reversing the direction of the supply current or by reversing the winding direction of the coreless armature coil 12.

Figure 7:
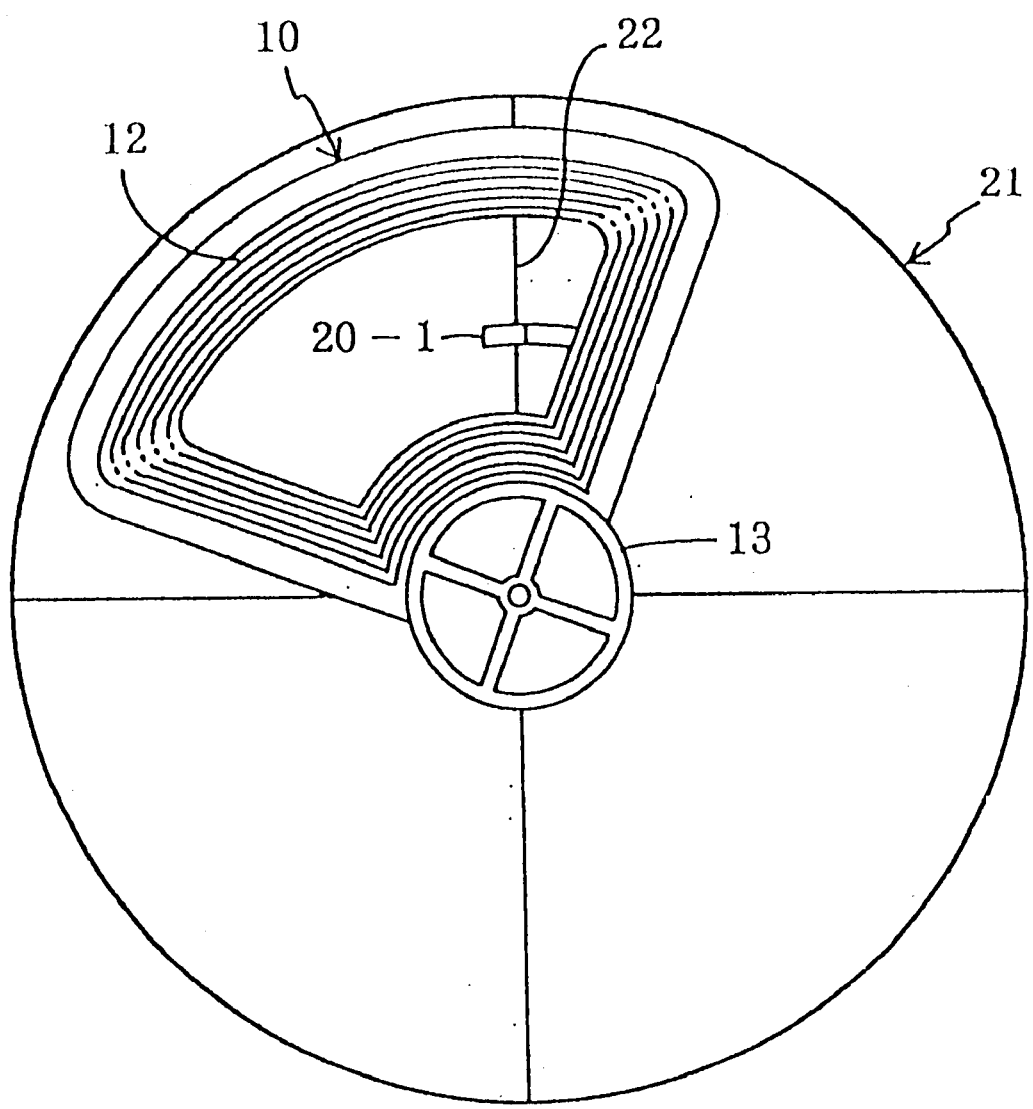
FIG. 7 is a plan view showing an armature having a magnetic material disposed inside it.
Figure 8:
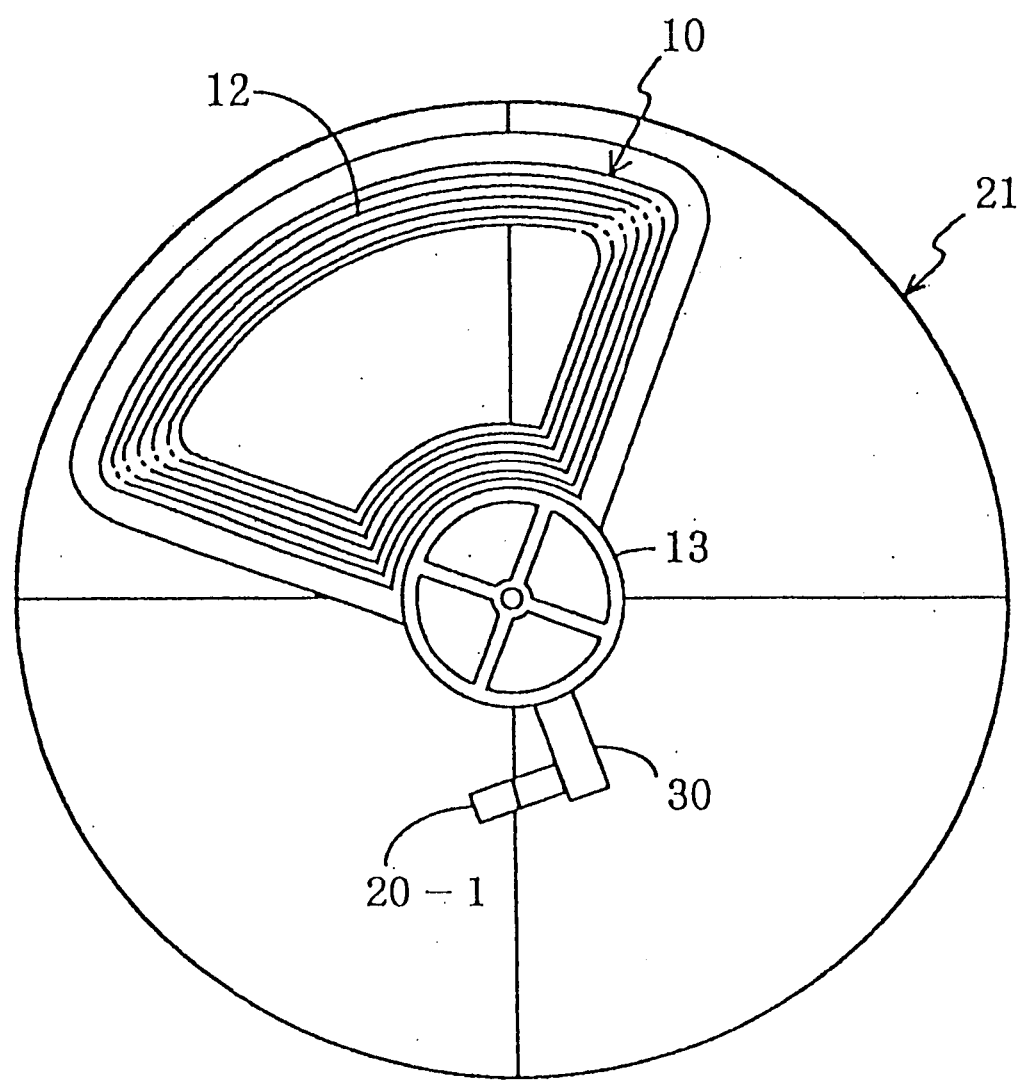
FIG. 8 is a plan view showing an armature having a magneic material provided at an arm portion opposite to the coil.
Figure 9:
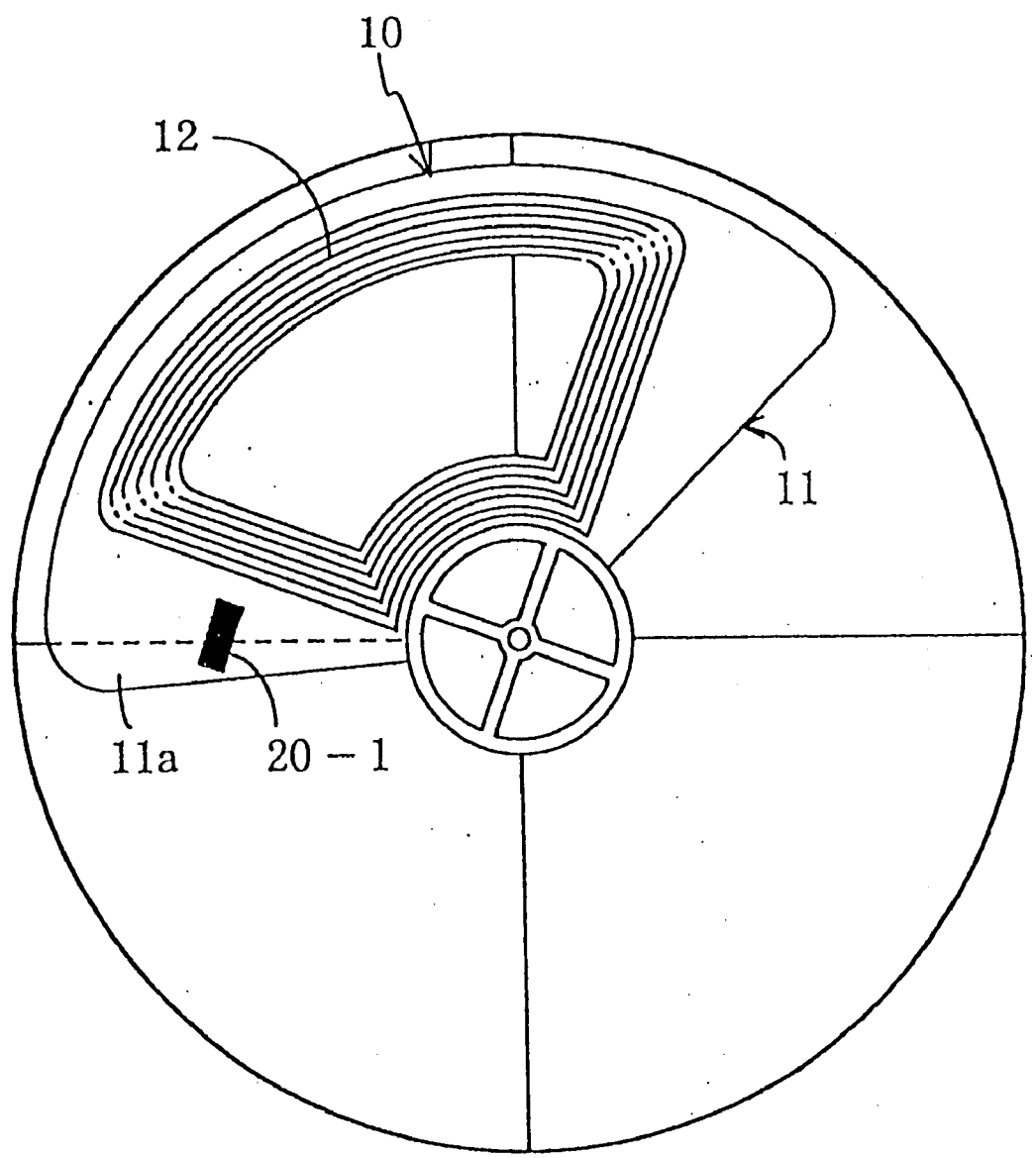
FIG. 9 is a plan view showing an armature having a magnetic material embedded in a resin frame.

In the above-mentioned embodiment, the magnetic material 20-1 projects in a direction nearly perpendicular to one side edge 11a of the resin frame 11, but may project in a direction not necessarily perpendicular to the one side edge 11a it only if N and S poles can be generated at both sides of the piece of magnetic material 20-1. It is also possible to provide the piece of magnetic material 20-1 at the other side edge 11b of the resin frame 11 as well as to make it project into the empty central part 16 of the coreless armature coil 12 as shown in FIG. 7. Furthermore, it is also possible to extend an arm portion 30 at the opposite side of the pivot portion 13 to the coreless armature coil 12 and make the piece of magnetic material 20-1 project from the arm portion 30 as shown in FIG. 8. And as shown in FIG. 9, it is also acceptable to make broader in width one side edge 11a of the resin frame molded together with the coreless armature coil 12 into one body and embed a piece of magnetic material 20-1 such as an iron pin and the like into this one side edge 11a. With this composition, since the piece of magnetic material 20-1 is more reliably held and can be molded together with the resin frame 11 into one body, the manufacturing process is simplified. In the above-mentioned embodiment, a case in which the field magnet 21 is divided into quarters and is alternately given N and S poles has been described, but it is sometimes more advantageous to divide the field magnet 21 into eight equal parts depending upon relation to the central angle of rotation of the coreless armature coil 12.

Figure 10:
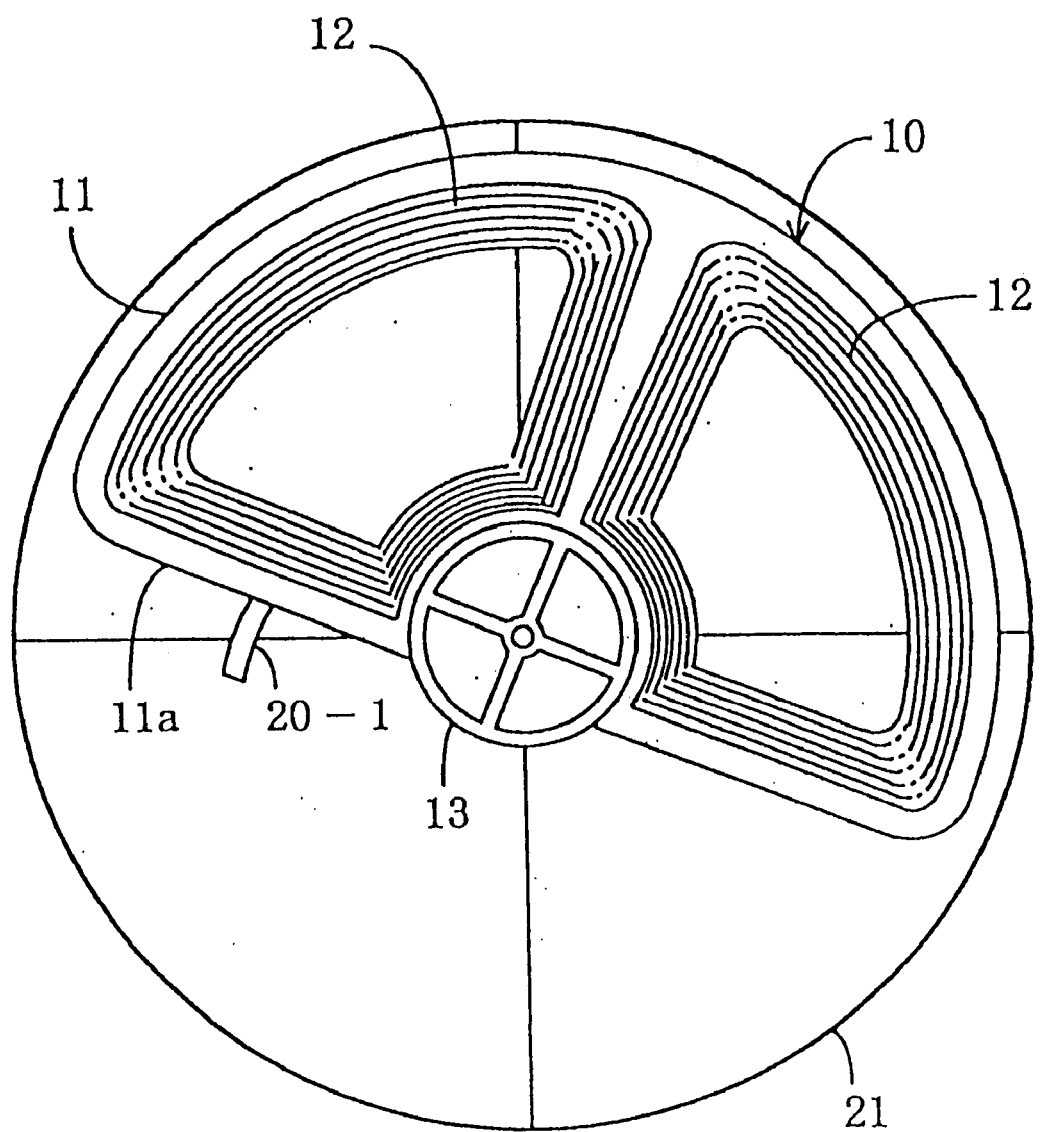
FIG. 10 is a plan view of an armature composed of two coils.

Although the above-mentioned embodiment is a case in which the armature 10 is composed of a single coreless armature coil 12, a case of two coreless armature coils 12 as shown in FIG. 10 also has the same problem with respect to starting the armature 10 to turn. In this case also, similarly to the armature 10 composed of a single coreless armature coil 12 as described above, the armature 10 can be smoothly started to turn by simply making the piece of magnetic material 120-1 project from one side edge 11a of the resin frame 11 of the coreless armature coil 12.

The above-mentioned embodiment has described a case of applying the invention to a vibration generator, but the invention can also be applied to an ordinary turning motor and a stepping motor.

Figure 11:
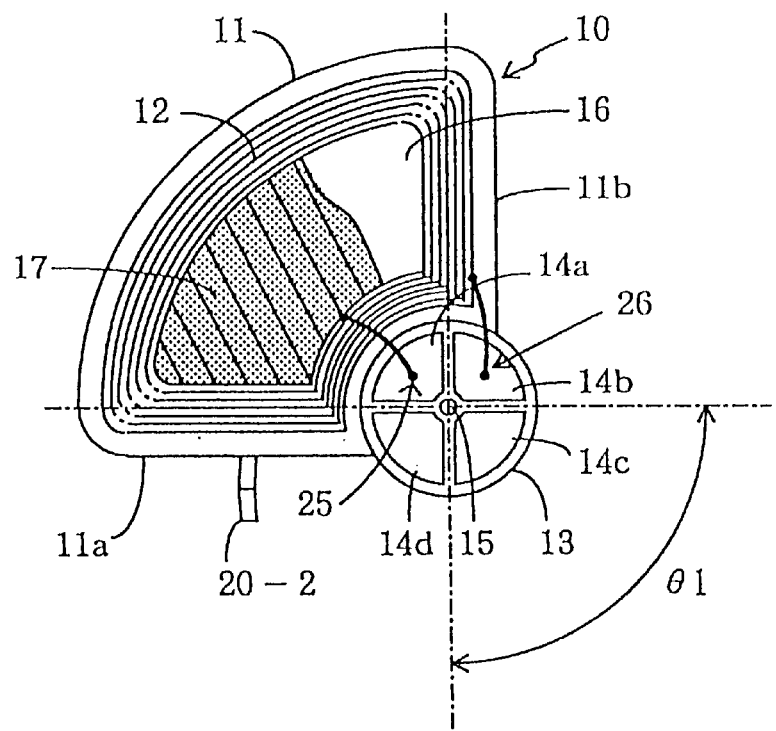
FIG. 11 is a plan view showing another embodiment of an armature structure of a flat motor of the present inventions
Figure 12:
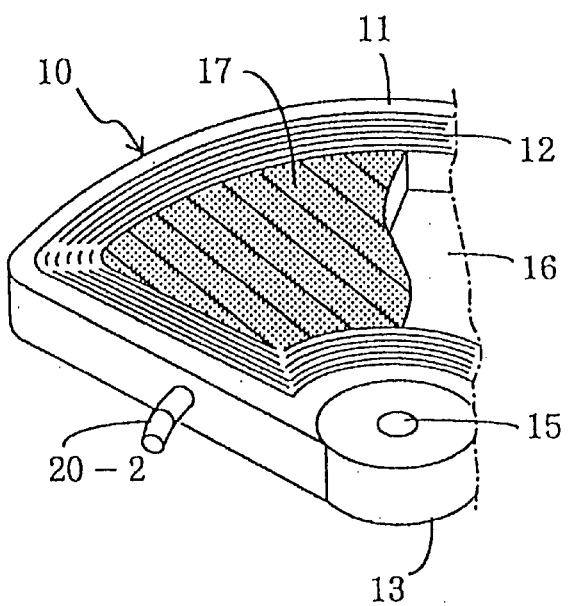
FIG. 12 is a perspective view showing a main part of the embodiment.
Figure 13:
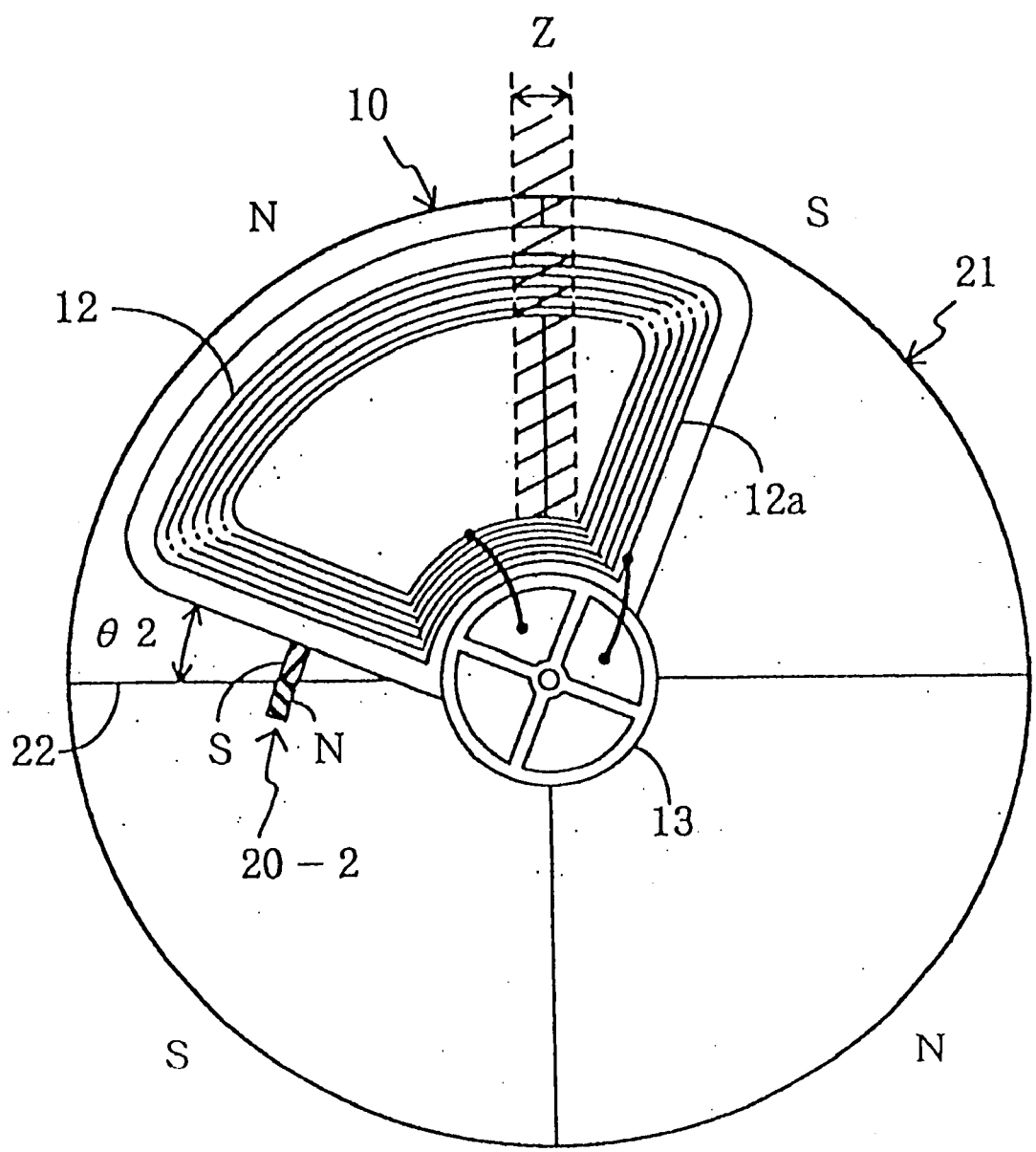
FIG. 13 is a plan view showing a stop position of the armature over a magnet of the embodiment.
Figure 14:
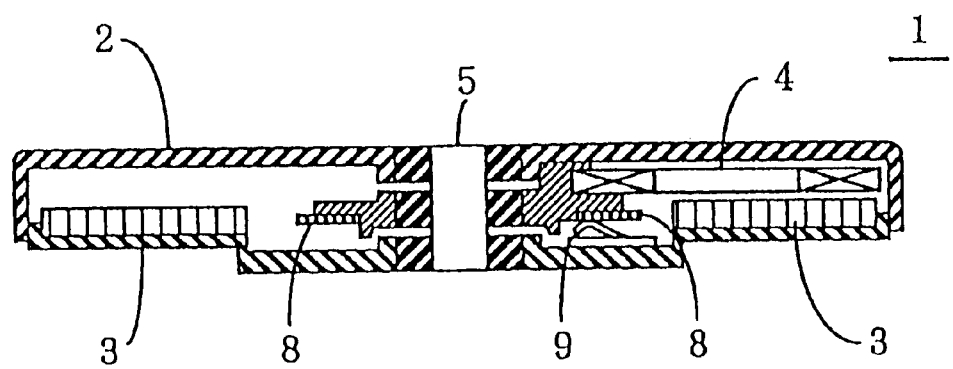
FIG. 14 is a vertical sectional view showing an example of a conventional flat motor.
Figure 15:
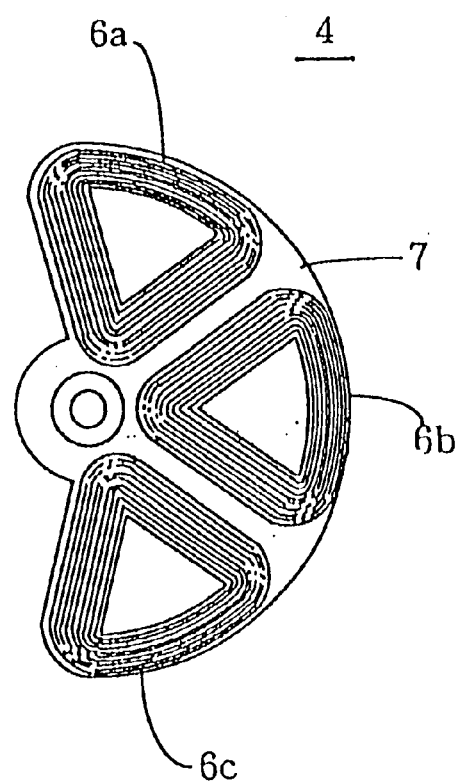
FIG. 15 is a plan view showing an example of an armature used in a conventional flat motor.
Figure 16:
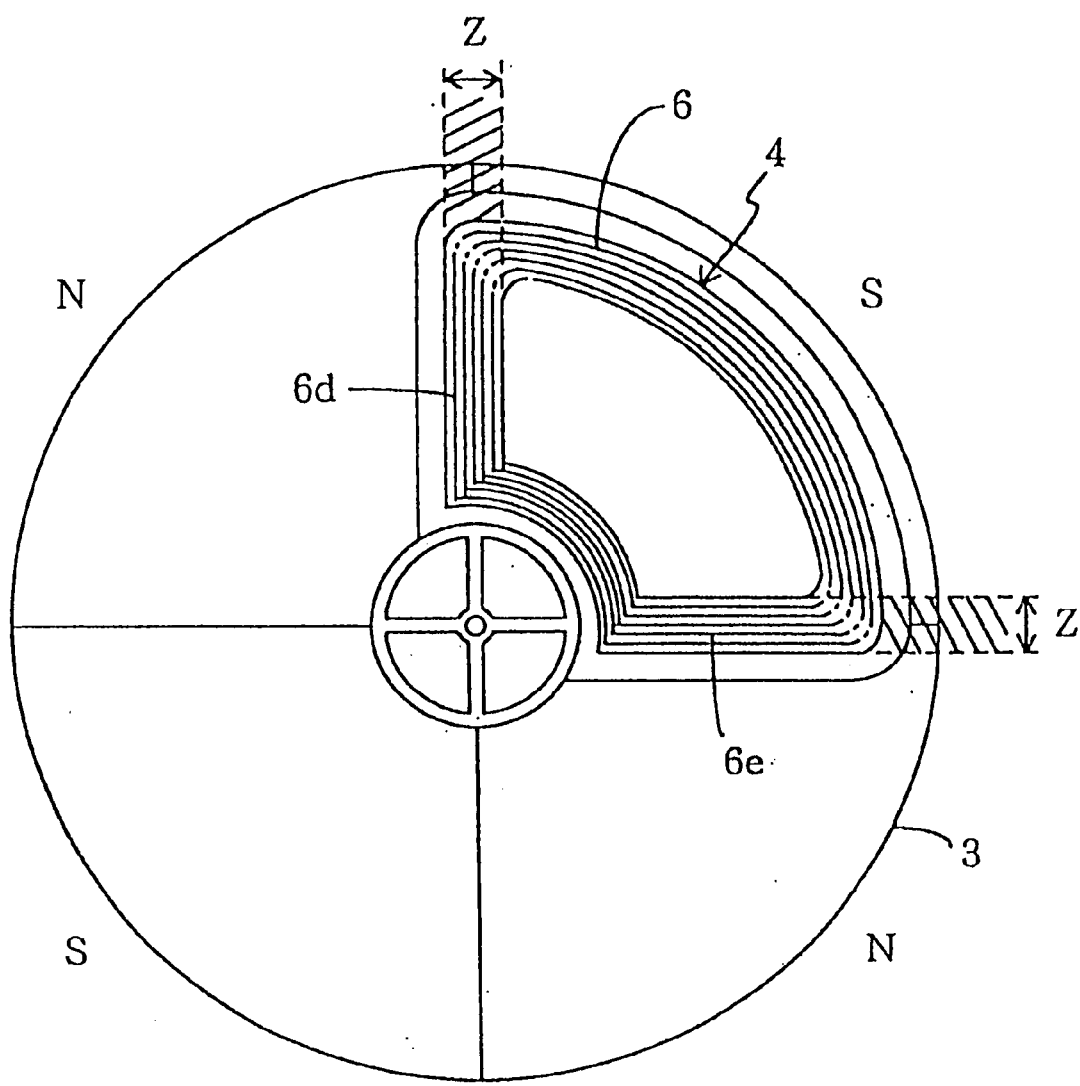
FIG. 16 is a plan view showing a positional relation when a conventional armature does not start over a magnet.

FIGS. 11 to 13 show another embodiment of an armature structure of a flat motor of the present invention. In this embodiment, a permanent magnet 20-2 projects sideward from one side edge 11a of the above-mentioned resin frame 11. This permanent magnet 20-2 is formed into the shape of a slender round bar or cylinder and is slightly curved inwards so as to form a part of an arc having an axis hole 15 as the center of rotation. That is to say, the projecting direction of the permanent magnet 20-2 is nearly parallel with the direction of rotation or reverse rotation of the armature 10, and is perpendicular to the one side edge ha. It becomes easy to form N and S poles at both sides of the permanent magnet 20-2 due to making the sectional shape of the permanent magnet 20-2 into the shape of a round bar. It is a matter of course that the permanent magnet 20-2 in the shape of a cylinder also brings the same effect.

Since the strength of a magnetic force of the permanent magnet 20-2 depends upon the length or the sectional area of the permanent magnet 20-2, it needs to be properly selected. That is to say, it is necessary to consider that while a magnetic force to force the armature 10 to stop at a specified position is required when stopping it, the magnetic force must be to such a degree that it does not impede rotation of the armature 10 when it is rotating. The shape of a permanent magnet is not limited to a slender round bar or cylinder like the permanent magnet 20-2, but the same effect can also be obtained by projecting a small piece in the shape of a flat plate or an ellipsoid.

FIG. 13 shows a positional relation at the time of stopping the armature 10 having the above-mentioned composition by means of a field magnet 21. The field magnet 21 is obtained by dividing a disk into quarters and arranging N and S poles alternately with each other, and rotatably holds the pivot portion 13 of the armature 10 at the center of the field magnet 21. When the armature 10 is turned clockwise or counterclockwise over the field magnet 21 and then a power source to supply power to the coreless armature coil 12 of the armature 10 is turned off, the S and N poles of the permanent magnet 20-2 are respectively attracted to the N and S poles of the field magnet 21 and thereby the armature 10 is stopped in a state where the center in the longitudinal direction of the permanent magnet 20-2 is located on a border line 22 between the N and S poles of the field magnet 21. That is to say, the armature 10 is stopped over the N pole of the field magnet 21 at any time in a state where it is shifted by an angle θ2 corresponding to half of the length of the permanent magnet 20-2, and comes into a state where one side portion 12a of the coreless armature coil 12 projects to the other side S pole adjacent to it. The reason for this is that when the armature 10 is stopped the N and S poles of the field magnet 21 and the S and N poles of the permanent magnet 20-2 respectively attract each other, and therefore the permanent magnet 20-2 and the field magnet 21 overcome a free rotation of the armature 10 and force it to stop at that position. In such a way, since one side portion 12a of the coreless armature coil 12 projects greatly to the S pole side from a domain Z on the field magnet 21 where the armature 10 is difficult to start, the armature 10 can be smoothly started.

In an armature structure of a flat motor of the present invention composed in such a manner, since an armature is provided with a magnetic material or a permanent magnet having N and S poles and when the armature is stopped from turning the magnetic material or the permanent magnet is located at the boundary between the N and S poles of the field magnet so that the coreless armature coil comes to a starting position. Even an armature composed of one or two coreless armature coils can be reliably and smoothly started as a result, the flat motor can be increasingly miniaturized and lightened, and the invention is more effective to the realization of an armature motor composed of one or two coreless armature coils from a viewpoint of man-hours and cost in a manufacturing process. As a motor used in a vibration generator, an armature structure of one coreless armature coil having a greater eccentric action brings a greater effect for the purpose of obtaining a greater vibration.

What is claimed is:

1. An armature structure for a motor containing a field magnet which has north and south magnetic poles, said armature structure comprising:

an armature to be axially spaced from the field magnet and having an axis of rotation and at least one coreless armature coil, wherein the axis of rotation is located outside of said at least one coreless armature coil; and a piece of magnetic material having north and south magnetic poles connected to said armature and operable to bring said armature into a starting position by positioning itself at a boundary between the north and south magnetic poles of the field magnet when said armature is stopped, such that said north and south magnetic poles of said piece of magnetic material are attracted to the south and north magnetic poles of the field magnet, respectively.

2. An armature structure according to claim 1, further comprising a frame to hold said at least one coreless armature coil, wherein said at least one coreless armature coil comprises only one coreless armature coil, and said piece of magnetic material comprises a permanent magnet which projects from one side portion of said frame.

3. An armature structure according to claim 1, further comprising a frame to hold said at least one coreless armature coil, wherein said at least one coreless armature coil comprises only one coreless armature coil, and said piece of magnetic material comprises a permanent magnet which is embedded in said frame.

4. An armature structure for a motor containing a field magnet which has north and south magnetic poles, said armature structure comprising:

an armature to be axially spaced from the field magnet and having an axis of rotation and at least one coreless armature coil, wherein the axis of rotation is located outside of said at least one coreless armature coil; and a permanent magnet having north and south magnetic poles connected to said armature and operable to bring said armature into a starting position by positioning itself at a boundary between the north and south magnetic poles of the field magnet when said armature is stopped, such that said north and south magnetic poles of said permanent magnet are attracted to the south and north magnetic poles of the field magnet, respectively.

5. An armature structure according to claim 4, further comprising a frame to hold said at least one coreless armature coil, wherein said at least one coreless armature coil comprises only one coreless armature coil, and said permanent magnet projects from one side portion of said frame.

6. An armature structure according to claim 4, further comprising a frame to hold said at least one coreless armature coil, wherein said at least one coreless armature coil comprises only one coreless armature coil, and said permanent magnet is embedded in said frame.

* * * * *